United States Patent [19]
Michaud et al.

[11] 3,723,866
[45] Mar. 27, 1973

[54] CAPACITIVE MOVEMENT MEASURING DEVICE

[75] Inventors: Jean-Francois Michaud; Gilles Delapierre, both of 38 Grenoble, France

[73] Assignee: Commissariat A L'Energie Atomique, Paris, France

[22] Filed: Apr. 7, 1971

[21] Appl. No.: 131,865

[30] Foreign Application Priority Data

Apr. 10, 1970 France..............................7013098

[52] U.S. Cl..................324/61 R, 317/246, 340/200
[51] Int. Cl............................G01r 27/26, H01g 7/00
[58] Field of Search...............324/61 R, 61 P, 61 QS; 317/246; 340/200

[56] References Cited

UNITED STATES PATENTS

| | | |
|---|---|---|
| 3,510,859 | 5/1970 | Makow..............................340/200 |
| 2,018,673 | 10/1935 | Howe..................................324/61 R |
| 2,925,590 | 2/1960 | Boltinghouse et al................340/200 |
| 3,219,920 | 11/1965 | Wall...................................324/61 R |
| 3,221,256 | 11/1965 | Walden..............................324/61 P |
| 3,348,133 | 10/1967 | Wolfendale........................340/200 |

Primary Examiner—Rudolph V. Rolinec
Assistant Examiner—Ernest F. Karlsen
Attorney—Cameron, Kerkam & Sutton

[57] ABSTRACT

A movement measuring sensor comprises a rule having parallel surfaces and a slider having parallel surfaces opposite the first parallel surfaces and movable relatively to the rule in a direction parallel to the surfaces. Each surface of the slider is provided with a first set of $n$ electrically interconnected conductive strips disposed at a pitch $p$ in such direction and the rule has N electrically interconnected conductive strips disposed at the same pitch $p$ and located opposite each of the first sets. The two capacitances each formed by a set of $n$ strips and a set of N strips are in series relation.

7 Claims, 6 Drawing Figures

Patented March 27, 1973 3,723,866

CAPACITIVE MOVEMENT MEASURING DEVICE

The invention relates to a device for measuring linear movements, and more particularly to a device which is very accurate (to about 1 micron) in which a lightweight senser dissipating virtually no energy is used, it being possible to use the device when the object whose movement it is required to measure is positioned inaccessibly, for example in vacuo.

The conditions just outlined often occur in laboratory conditions, as when it is required to measure the movement of members of ion sources. In such cases movements have to be measured which are of relatively low amplitude but which must be measured very accurately and in a high vacuum, in the presence of stray electromagnetic fields and possibly intense vibrations.

There are many known linear movement measuring devices of high sensitivity and accuracy, including optical systems providing a resolution and accuracy of something like 0.1 micron; unfortunately, they are excessively heavy and bulky. Devices using a differential transformer as a senser or detector are insufficiently stable and the senser cannot readily be screened from stray electromagnetic fields. There are also electrical devices in which the senser is a capacitor, variations in the capacitance thereof being measured. The usual practice is for the movement which it is required to measure to alter the distance between the sets of plates of the capacitor. Capacitors are light and small and dissipate substantially no energy, can readily be screened from electric fields and are uneffected by magnetic fields; unfortunately, the known devices of this kind are not accurate enough.

It is an object of the invention to provide a linear movement measuring device using a capacitor as senser and with a better practical performance than the known devices, for example by being more accurate while retaining most of the advantages of the prior art facilities.

The invention accordingly provides a movement-measuring device comprising: a senser comprising two elements, one of which is a rule having parallel surfaces and the other of which is a slider having parallel surfaces opposite the first parallel surfaces, the elements being movable relatively to one another in a given direction parallel to the surfaces, one of the elements having on each of its surfaces a first set of $n$ electrically interconnected conductive strips disposed at a pitch $p$ in such direction, the other element having opposite each of the first sets N electrically interconnected conductive strips disposed at the same pitch $p$; means for connecting in series two capacitances each formed by a set of $n$ strips and a set of N strips; and means for measuring the total capacitance. As will be apparent, the relative movements between the rule and the slider vary the capacitance periodically by varying the conductive surfaces opposite one another, and this periodically makes precision virtually independent of the amplitude of the movement to be measured, as is of course nor the case when the variation of capacitance is continuous over the whole extent of the movement. Also, the error source represented by transverse movements disappear substantially completely because of the symmetrical circuit arrangement.

Advantageously, the first element has on each of its surfaces a second set of $n$ conductive strips which are identical to the first set but which are offset by half a pitch $p/2$ relatively to the first strips; and means are provided for measuring the total capacity of the two extra capacitors whose plates are formed on the one hand by the second set and on the other hand by the two sets of N strips, the two capacitors being in series.

There are two advantages of this feature. First, it provides sensing of the direction of movement from any given intermediate point and second, by switching from one capacitor to the other it makes it possible to use whichever capacitor is the more accurate as reference.

The invention will be better understood from the following description of a device forming an embodiment of the invention and given by way of example, reference being made to the accompanying drawings wherein.

Figure 1:
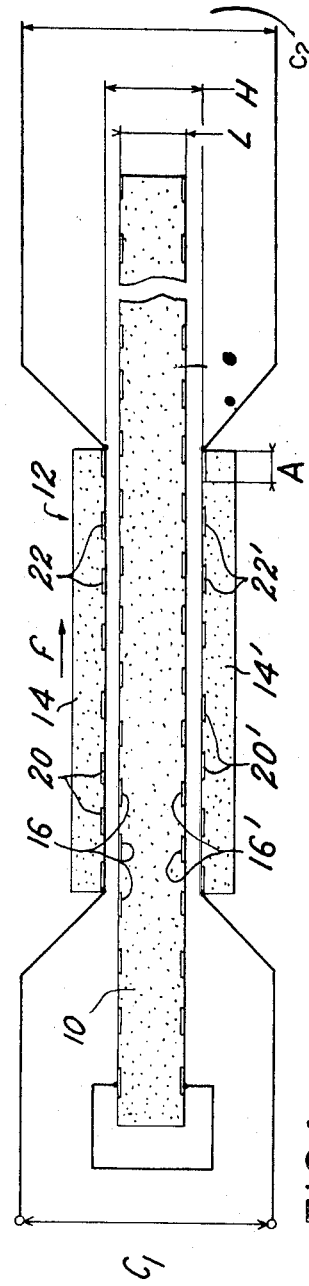
FIG. 1 is a diagrammatic view of the senser of the device, the view being in section in a plane parallel to the movement direction.

A capacitative senser or detector shown diagrammatically in FIG. 1 comprises two members which can move relatively to one another in the direction indicated by an arrow $f$ and in the opposite direction. One such member is a flat rule 10 having two plane parallel surfaces. To measure to an accuracy of 1 micron, high accuracy of something like 0.1 micron is needed, and to achieve this accuracy and maintain the separation between the surfaces despite temperature variations, there can be used for example an optically polished silica rule with a very low heat expansion coefficient. The second member 12 is a slider comprising two plates 14 14' which are rigidly secured to one another by means not shown in FIG. 1 and which keep the internal surfaces at a constant separation from one another and which are disposed opposite the parallel surfaces of the rule 10. As will be seen hereinafter, the conductive strips on the slider 12 are all operative for each movement, and so the parallelism of the slider surfaces need not be so accurate as the parallelism of the surfaces of the rule 10. However, and as will be seen hereinafter, the spacing must remain constant notwithstanding temperature variations, and so transverse wedging members of melted silica can be used to determine the spacing.

Figure 2:
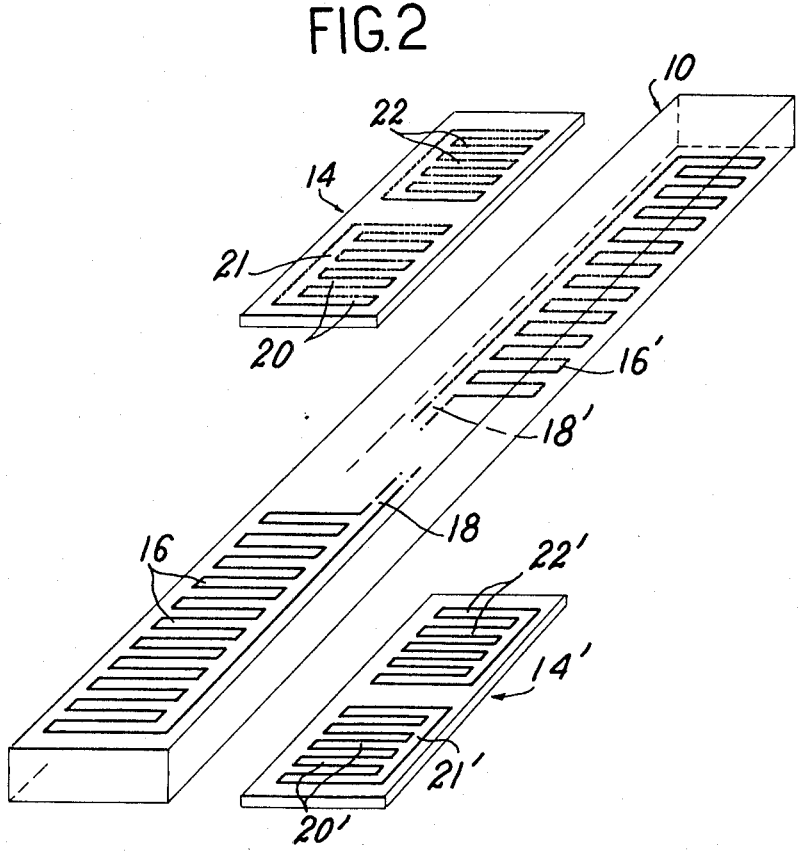
FIG. 2 is an exploded detailed perspective view showing the pattern and relative arrangement of the strips on the rule and on the slider.
Figure 2A:
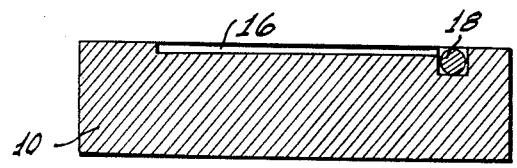
FIG. 2A is a partial cross-sectional view of the structure of FIG. 2.

The two surfaces of the rule 10 bear "combs" each embodied by N strips 16 which are interconnected electrically in parallel. The strips 16 can be produced by vacuum coating or by photogravure, both of which processes can provide a thickness not exceeding 0.1 micron and a pitch accuracy of something like 0.1 micron. The electrical connection can take the form of a metal wire 18 placed in a groove interconnecting the strips as seen in FIG. 2A. The groove is disposed laterally and the opposite way round on the two surfaces of the rule 10. The length of the strips 16, 16' determines the measurable movement amplitude; in the case shown in FIG. 2 the strips 16, 16' take up the whole length of the rule.

The facing surfaces of the slider plates 14,14' each have a comb of n strips 20,20' having the same pitch and the same width as the strips 16,16'. The strips of any one plate are connected in parallel. As with the strips 16 and 16', the connection can be by means of metal wires 21,21'. Advantageously, the wires 21,21' are disposed oppositely in respect of the wires 18,18' for the sake of symmetry. All the n strips of each plate are continually operative in measurement so that any fault, such as lack of parallelism, occurs systematically in all measurements and, in contrast to what happens with the rule 10, does not lead to an error. Slider tolerances can therefore be broader than rule tolerances.

The capacitors formed one by the combs of strips 16, 20 and the other by the combs of strips 16', 20' are connected in series (FIG. 1); the resulting capacitances can be read either directly or indirectly by ancillary means to be described hereinafter. The advantage of this series arrangement is to damp very appreciably the effects of an accidental movement of the rule towards either of the plates 14 or 14', for as a simple calculation will show, the resulting capacitance $C_1$ when the strips are disposed opposite one another is given the relationship $C_1 = A/(H-L)$, in which H denotes the distance between the strips 20 and 20', L denotes the distance between the strips 16 and 16', and A denotes the width of the strips (equal to half the pitch). The dielectric constant is taken to be 1, as is the case when the senser is placed in a vacuum enclosure. This formula shows that off-centredness of the rule has no effect.

Advantageously, since it is difficult to deposit the strips 16, 16' on the rule 10 exactly opposite one another, the plates 14,14' are interconnected by a securing system which has some provision for adjusting their longitudinal position, so that the combs register with one another accurately.

A disadvantage of the senser just described is that there is an identical capacity for two different relative positions of the rule and slider in any one pitch or division. For sensing the direction, the senser shown in FIGS. 1 and 2 has two extra combs on the surfaces opposite the plates 14, 14'. The comb strips 22, 22' are offset by half a pitch from the strips 20 and 20'. Consequently, assuming that the variation in the capacity $C_1$ from a given origin position (in which the strips 16 and 20 are opposite one another) follows a cosine law, the capacitance $C_2$ embodied by the two serially connected capacitors comprising the one the strips 22, 16 and the other the strips 22', 16' follows a sine law from the same origin. The doubt can therefore be cleared up just by changing over the measurement. Another advantage of the changeover is the possibility of using for each measurement whichever of the two pairs of capacitors gives better linearity.

Figure 3:
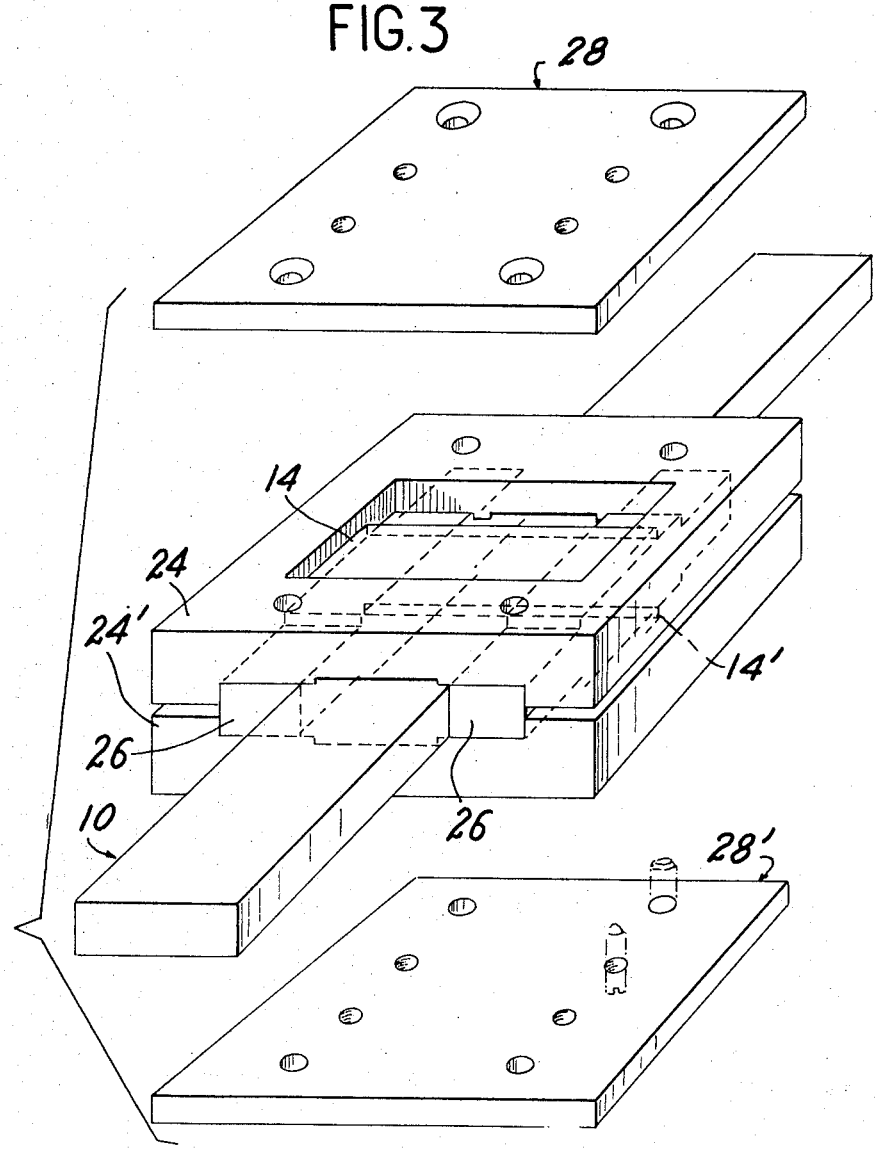
FIG. 3 is a perspective view in partial section of a complete senser according to FIG. 1.

In practice the senser can be embodied as shown diagrammatically in FIG. 3. The rule 10 slides by way of its stripless lateral portions on two frames 24, 24' which bear the two slider plates. Melted silica crosspieces 26 maintain the spacing between the plates. Two clamping plates 28,28' interconnected by screws (not shown) engage the frames 24, 25 with the crosspiece 26.

Figure 3A:
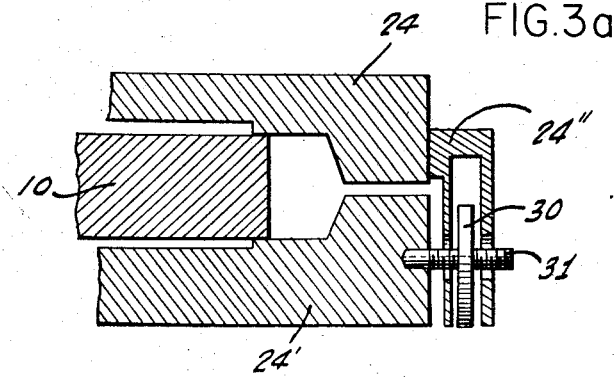
FIG. 3A is a partial sectional view of the structure of FIG. 3 showing adjustment means.

The position of rule 10 can be adjusted in a direction parallel to its surfaces and perpendicular to the direction of movement by the construction seen in FIG. 3A. A yoke 24'' is allocated to frame 24 and receives a manually actuatable wheel 30 mounted on threaded rod 31 which is received in frame 24'. Rotation of wheel 30 thus moves frame 24 with respect to frame 24' with corresponding movement of rule 10.

In an embodiment for measuring movements to an accuracy of 1 micron the combs have a 2 mm pitch and a width of 20 mm. The rule is a melted optically polished 4.5 mm thick silica strip. Strip width, which is equal to half a pitch, is 1 mm.

It is preferable to determine the capacitance C by an indirect method which is much more accurate than any direct measurement. One possible indirect method is to measure the frequency of a variable-frequency oscillator whose tuning capacity is the senser. The advantage of this feature is that the measurement is little affected by supply voltage variations and is very stable; however, because of the disadvantage of the non-linear relationship between frequency and capacitance, it is preferable to measure capacitance by means of a voltage measurement; this too can be very accurate, to the order of something like $10^{-3}$, if done with a numerical voltmeter.

Figure 4:
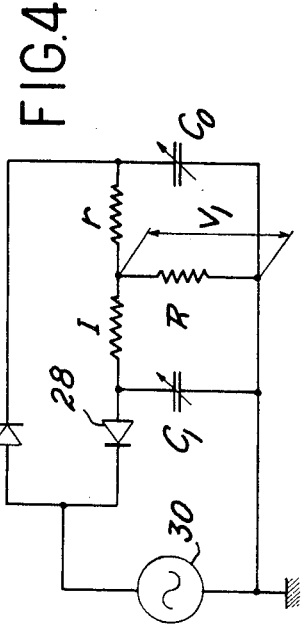
FIG. 4 is a circuit diagram of a capacitance-measuring circuit associated in the device with the senser shown in FIGS. 1 to 3.

FIG. 4 shows a basic circuit diagram for converting capacitance measurement into a voltage measurement; a complete description can be found in an article by S. Lion on pages 353 to 356 of the March 1964 issue of the "Review of Scientific Instruments".

The circuit, which is of the kind having two diodes 28 with identical characteristics, is energized by a high-frequency generator 30 operating in the MHz range to keep the response time very short. A sensitivity of 100 millivolts/picofarad for a capacitance $C_1$ whose average value is 15 pF can readily be achieved. By switching between $C_1$ and $C_2$ a satisfactory linear relationship can be provided between movement and capacitance over consecutive quarter-pitches.

The invention can of course be varied in many ways. More particularly, the slider strips belonging to the same set are, with advantage, interconnected by a wire disposed not laterally, as shown in FIG. 2, but in the center-plane of the corresponding plate. This feature considerably reduces errors due to lateral clearances.

We claim:

1. A movement-measuring device comprising a senser, two elements for said sensor, one of said elements being a rule, parallel surfaces for said rule, the other of said elements being a slider, parallel surfaces for said slider opposite said parallel surfaces of said rule, said elements being movable relatively to one another in a predetermined direction parallel to said parallel surfaces, one of said elements having on each of its parallel surfaces a first set of n electrically interconnected conductive strips, n being an integer greater than one disposed at a predetermined pitch in said predetermined direction, the other of said elements having mounted thereon opposite each of said first sets of strips N electrically interconnected conductive strips disposed at the same pitch, N being an integer greater than one; two capacitances each formed by a set of n interconnecting said capacitances in series; and means for measuring the total capacitance.

2. A device according to claim 1, wherein said first element having on each of its parallel surfaces a second set of $n$ conductive strips identical to said first set and offset by half of said pitch relatively to said first strips; and means for measuring the total capacity of the two extra capacitors formed by said second set and by the two sets of N strips, said two capacitors being in series.

3. A device according to claim 2, said rule being a silica rod said parallel comb surfaces of said rod being optically polished.

4. A device according to claim 2, said slider including two plates and means for moving said plates relatively to one another lengthwise to compensate for any offset between said strips on said two parallel surfaces of said rule.

5. A device according to claim 1, said interconnection between said strips being a metal wire in a groove interconnecting an edge of said strips, the arrangement of said wires reversing at changeover from one of said elements to the other of said element.

6. A device according to claim 1 including means for adjusting the position of said rule in a direction parallel to its surfaces and perpendicular to the movement direction.

7. A device according to claim 1, the rule being guided in the casing by its stripless lateral parts sliding on stripless surfaces of the casing.

* * * * *